(12) United States Patent
Portet et al.

(10) Patent No.: US 10,807,315 B2
(45) Date of Patent: Oct. 20, 2020

(54) METHOD FOR PRODUCING A COMPLEX COMPOSITE PART, IN PARTICULAR HAVING A THERMOPLASTIC MATRIX

(71) Applicant: DAHER AEROSPACE, Saint Julien de Chédon (FR)

(72) Inventors: Stéphanie Portet, Le Loroux Bottereau (FR); Julie Vaudour, La Chevrolière (FR)

(73) Assignee: DAHER AEROSPACE, Saint Julien de Chédon (FR)

( * ) Notice: Subject to any disclaimer, the term of this patent is extended or adjusted under 35 U.S.C. 154(b) by 185 days.

(21) Appl. No.: 15/531,464

(22) PCT Filed: Dec. 31, 2015

(86) PCT No.: PCT/EP2015/081476
§ 371 (c)(1),
(2) Date: May 29, 2017

(87) PCT Pub. No.: WO2016/110444
PCT Pub. Date: Jul. 14, 2016

(65) Prior Publication Data
US 2017/0326817 A1    Nov. 16, 2017

(30) Foreign Application Priority Data
Jan. 9, 2015   (FR) ...................... 15 50167

(51) Int. Cl.
*B29C 65/52* (2006.01)
*B33Y 10/00* (2015.01)
*B29C 70/84* (2006.01)
*B29C 70/68* (2006.01)
*B29C 64/10* (2017.01)
(Continued)

(52) U.S. Cl.
CPC .............. *B29C 65/52* (2013.01); *B29C 64/10* (2017.08); *B29C 64/106* (2017.08); *B29C 64/30* (2017.08); *B29C 65/04* (2013.01); *B29C 65/524* (2013.01); *B29C 65/70* (2013.01); *B29C 65/72* (2013.01); *B29C 69/00* (2013.01); *B29C 70/54* (2013.01); *B29C 70/68* (2013.01); *B29C 70/84* (2013.01); *B33Y 10/00* (2014.12); *B33Y 40/00* (2014.12);
(Continued)

(58) Field of Classification Search
CPC ... B29C 64/106–64/135; B29C 64/118; B29C 70/04–70/56; B29C 65/14; B29C 65/1403; B29C 65/1425
See application file for complete search history.

(56) References Cited

U.S. PATENT DOCUMENTS

| | | | |
|---|---|---|---|
| 9,168,855 B2 * | 10/2015 | Evans | B60N 2/68 |
| 2014/0127521 A1 * | 5/2014 | Ishibashi | B29C 70/345 |
| | | | 428/474.7 |
| 2014/0134383 A1 | 5/2014 | Hugon et al. | |

FOREIGN PATENT DOCUMENTS

| | | |
|---|---|---|
| EP | 2 801 512 A1 | 11/2014 |
| EP | 2 726 272 B1 | 4/2015 |

(Continued)

*Primary Examiner* — Benjamin A Schiffman
(74) *Attorney, Agent, or Firm* — Im IP Law; Chai Im; C. Andrew Im

(57) ABSTRACT

A method for manufacturing a composite part with continuous fiber reinforcement and a polymer matrix from a composite preform. On one of the faces of the composite preform, a demarcated layer of thermoplastic polymer is deposited using an additive manufacturing method.

2 Claims, 2 Drawing Sheets

(51) Int. Cl.
  *B29C 65/72* (2006.01)
  *B29C 65/70* (2006.01)
  *B29C 70/54* (2006.01)
  *B29C 64/106* (2017.01)
  *B33Y 40/00* (2020.01)
  *B33Y 70/00* (2020.01)
  *B29C 64/30* (2017.01)
  *B29C 65/04* (2006.01)
  *B29C 69/00* (2006.01)
  *B29K 101/12* (2006.01)
  *B29K 505/00* (2006.01)

(52) U.S. Cl.
  CPC .......... *B33Y 70/00* (2014.12); *B29K 2101/12* (2013.01); *B29K 2505/00* (2013.01)

(56) References Cited

FOREIGN PATENT DOCUMENTS

| | | |
|---|---|---|
| FR | 2 922 276 A1 | 4/2009 |
| FR | 2 987 305 A1 | 8/2013 |
| WO | 2008/146047 A2 | 12/2008 |
| WO | 2013/180848 A1 | 12/2013 |

\* cited by examiner

METHOD FOR PRODUCING A COMPLEX COMPOSITE PART, IN PARTICULAR HAVING A THERMOPLASTIC MATRIX

RELATED APPLICATIONS

This application is a § 371 application from PCT/EP2015/081476 filed Dec. 31, 2015, which claims priority from French Patent Application No. 15 50167 filed Jan. 9, 2015, each of which is incorporated herein by reference in its entirety.

FIELD OF THE INVENTION

The invention relates to a method for manufacturing a complex composite part, particularly with a thermoplastic matrix, and a part obtained using such a process. The invention is more particularly but not exclusively intended for the aeronautics industry and the manufacturing of a part with a polymer matrix reinforced by continuous fibers, the shape of which comprises more than one face, wherein said faces are flat or curved.

For example, such a part may be a flat or curved panel with ribs or stiffeners or a dihedral or trihedral part, but such examples are not exhaustive or limitative.

BACKGROUND OF THE INVENTION

According to the prior art, making a composite part with a continuous fiber reinforcement extending along more than two faces is difficult. An example of a part extending along two faces is an L angle. Whenever there are more than two faces it is difficult or even impossible to retain fiber continuity in such a configuration. Thus, in order to obtain that result, other elements must be added to a first preform, wherein said elements are added using conventional assembly techniques such as welding or co-curing The document EP 2 726 272 describes a method for assembling a local reinforcement on a panel by means of welding. The use of said method makes it necessary for the polymer making up the matrix of the panel or the local reinforcement to be a thermoplastic polymer and the polymers making up the two matrices to be weldable.

Also, significant tooling is required for implementation.

Document FR 2 987 305 describes a method and a device for welding a stiffener on a panel. The process makes it possible to simplify the tooling, but has the same limitations as the previous one, or requires the incorporation of a thermoplastic strip in the laying up of the panel at the faces to be welded. Other processes of the prior art use dynamic welding between the parts, such as by induction, and make it necessary for that purpose to integrate a metal susceptor in one of the assembled parts at the location of the weld.

Document FR 2 987 305 describes a method for making a trihedral part made of composite material with continuous fibers and a thermoplastic matrix. Even though this method makes it possible to obtain a part with three faces, said faces are not continuous with each other, so that an opening remains between the faces, which happens to be a difficulty for some applications of such parts, such as for instance the use described in FR 2 922 276.

Besides, over molding is known in the prior art, particularly by injection, to make raised features on a composite part with a thermoplastic matrix. That method is used in the automotive industry or in the consumer electronics industry. It makes it necessary to develop an injection mold and remains limited to parts with small dimensions that are produced in very large quantities. Those conditions of use are generally unsuitable for the field of aeronautics.

OBJECT AND SUMMARY OF THE INVENTION

The invention aims to remedy the drawbacks of the prior art and therefore relates to a method for manufacturing a composite preform with continuous fiber reinforcement and a polymer matrix, which method comprises a step (i) of depositing on one of the faces of the preform a demarcated layer of thermoplastic polymer using an additive manufacturing method. That additive manufacturing stage makes it possible, depending on the mode of implementation, to particularize an area of the part in terms of properties, or create a raised feature with a functional or structural purpose on said preform. Unlike the methods of the prior art, the method according to the invention does not use or uses very little specific tooling and has few limitations in terms of the dimensions of the preform.

The term preform is used here in a broad sense, corresponding to a composite component that needs to undergo additional operations, particularly by assembly, in order to make up a part.

The invention can be implemented advantageously in the embodiments described below, which may be considered individually or in any technically operative combination.

In an advantageous embodiment, the polymer making up the layer deposited in step (i) comprises dispersed metal particles. That embodiment gives electrical conduction or magnetic permeability properties to the surface of the preform, for example in order to protect the part from lightning.

Advantageously, the method according to the invention comprises, after step (i), a step of:

ii. making a welded assembly by melting the layer of thermoplastic polymer deposited during step (i).

This embodiment is particularly advantageous when the composite preform comprises a matrix made of thermosetting polymer, and makes it easy to locally add a layer of weldable polymer.

Advantageously, the layer deposited in step (i) comprises metal particles and the welding process is a dynamic process. For example, such a process uses induction or microwave heating, wherein the material can be heated locally by using the susceptor effect created by the particles comprised in the layer of polymer to thus speed up welding and simplify the tools.

In one embodiment, the layer deposited in step (i) constitutes a rib extending perpendicular to the face of the preform. The term rib is used here in the broad sense independently of any particular technical effect and refers to a raised feature with any contour that projects out from the surface of the part.

In an alternative embodiment, the composite preform has two secant faces and the rib extends between said two faces.

In a particular embodiment, the method according to the invention comprises, after step (i), a step of:

iii. making an assembly using the rib as the means for the relative positioning of the assembled preforms.

That embodiment makes subsequent assembly work easier, particularly as part of an assembly called a "mechanical" assembly, that is to say with no counter drilling, no equipment such as brackets for installing systems, on structural aircraft parts. The use of additive manufacturing for making said ribs makes it possible to take advantage of numerical controls to precisely adapt the positioning of said ribs to the actual shape of the preform.

In another embodiment, the composite preform comprises three secant faces and the layer deposited in step (i) extends between said three faces. This embodiment particularly makes it possible to close a trihedral preform known as a "corner fitting" obtained using the method described in EP 2 987 305, particularly for sealing purposes.

Advantageously, the layer deposited in step (i) is deposited along a repeated pattern to cover the demarcated face. Thus, the consumption of polymer deposited by additive manufacturing is reduced.

BRIEF DESCRIPTION OF THE DRAWINGS

The invention is described below in its preferred embodiments, which are not limitative in any way, and by reference to FIGS. 1 to 4, wherein.

DETAILED DESCRIPTION OF THE EMBODIMENTS

Figure 1:
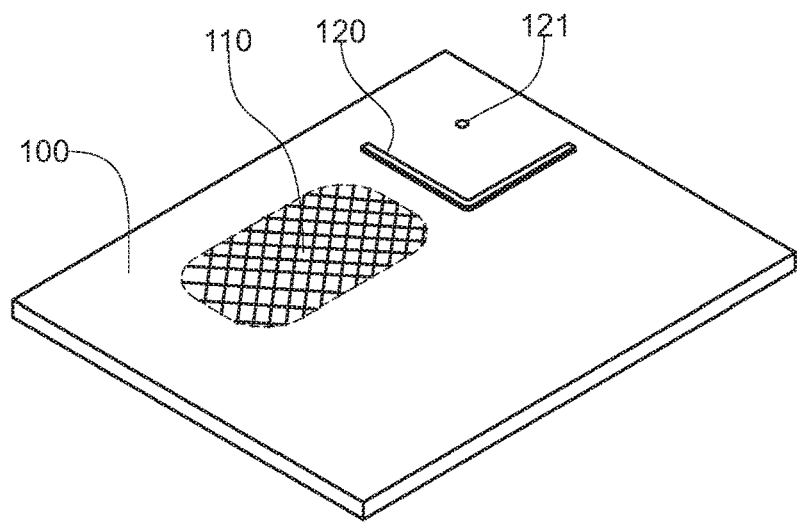
FIG. 1 is a schematic perspective view of two exemplary embodiments of the use of the process according to the invention.

In FIG. 1 of a schematic exemplary embodiment, the method according to the invention comprises the making of an assembly zone (110) on a consolidated preform (100). Said zone (110) comprises a layer made of thermoplastic polymer. In this exemplary embodiment, the polymer is deposited on the preform (100) in the form of lines (111, 112) that thus form a repetitive pattern. Said lines (111, 112) are deposited on the preform (100) by an additive manufacturing process, for example a process for projecting and melting thermoplastic powder through a nozzle, the movements of which are controlled by a numerical control. Such a method makes it possible to deposit fine lines (111, 112), as the minimum thickness allowed by current technology ranges from 0.05 mm to 0.1 mm. In an exemplary embodiment, the preform (100) is made of a layered structure of fibrous plies with continuous fibers in a thermosetting polymer matrix, for example carbon fibers in epoxy resin. The depositing of thermoplastic lines (111, 112) makes it possible, for example, to create a welding zone.

Figure 2:
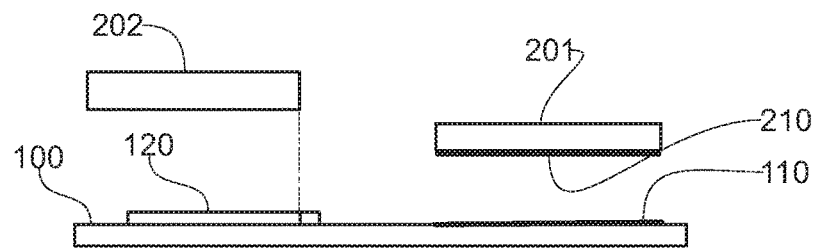
FIG. 2 is an exploded view from the left of the exemplary assembly of the preforms using additive manufacturing depositions of FIG. 1.

In FIG. 2, the depositing of thermoplastic film in an assembly zone (110) thus makes it possible to assemble on the face of the preform (100) a second preform (201) made of stratified composite material. In an exemplary embodiment, said second preform also comprises a zone (210) on which a thermoplastic film is deposited by additive manufacturing. Thus, it is possible to weld two preforms (100, 201), wherein the polymer making up the matrix is a thermosetting resin. The deposited thermoplastic polymer is selected for its melting temperature, which is such that the temperature reached during welding does not affect the properties of the thermosetting matrix. Alternatively, the polymer making up the matrix of one of the two preforms, or both of them, is a thermoplastic polymer. In that case, the deposited polymer is for example of the same nature as the polymer making up the to matrix, or is selected deliberately for its melting temperature below the polymer making up the matrix, or for its properties of miscibility with said polymer making up the matrix, depending on the result to be achieved.

In one embodiment, the weld is made statically by pressing the second preform (201) on the first one (100) and raising the temperature of the whole to the is melting temperature of the polymer at the interface of the two parts, for instance in a stove.

In another embodiment, the weld is made dynamically, for example using ultrasound. In other examples of dynamic welding, this is done using induction or microwaves. In that case, the deposited polymer is advantageously charged with particles that can focus the electric field and act as a susceptor. For example, said particles are metal or ceramic particles, such as ferrites.

Returning to FIG. 1, in another implementation of the method according to the invention, a raised form (120) is deposited on the surface of the part.

In FIG. 2, for example, the relief (120) is used as a means to position on the preform (100) a part (202) assembled with it. The part (202) thus added is assembled by welding, gluing or using fasteners. It is made of plastic, composite or metal. Thus, the preform (100) comprises several raised pre-positioning features. For example, the preform is the frame of an aircraft fuselage and the raised feature (120) makes it possible to position a support for a system. Thus, the added part (202) is perfectly positioned on the preform.

Returning to FIG. 1, the use of additive manufacturing for making the raised feature (120) for positioning makes it possible to combine, in the same operation, that is without removing the preform (100) from the machine, the making of the raised feature and the hole (121) that is positioned perfectly in relation to said raised feature, and thus allow the added part to be assembled "mechanically", positioned on the raised feature.

Figure 3:
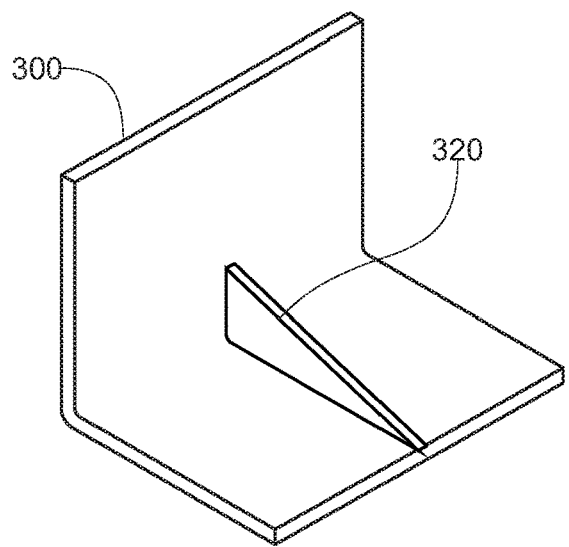
FIG. 3 is a schematic perspective view of an exemplary implementation of the method according to the invention on a dihedral preform.

In FIG. 3 of another implementation of the method according to the invention, the composite preform (300) comprises two faces, and the additive manufacturing method makes it possible to deposit a raised feature (320), such as a rib extending between the two faces of the preform. Said rib (320) has a structural or functional purpose.

Figure 4:
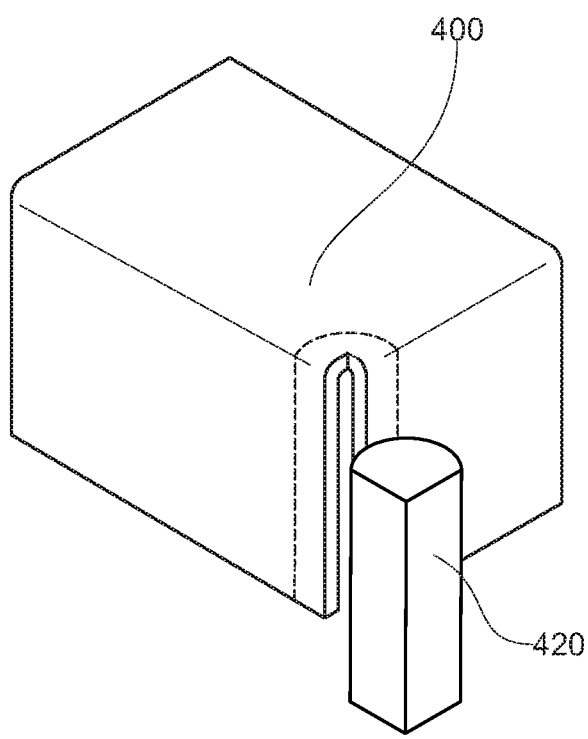
FIG. 4 is a schematic perspective exploded view of an exemplary implementation of the method according to the invention on a trihedral preform.

In FIG. 4 of another embodiment of the method according to the invention, the preform (400) is a composite trihedral part obtained by bending along two secant folding lines. Using the additive manufacturing method makes it possible to add a part (420) extending on the three faces of the preform, to close said trihedral preform The description above and the exemplary embodiments show that the invention achieves the objectives sought, in particular it makes it possible to precisely position an addition of material on a composite preform, and in the same operation, carry out complementary machining, thus perfectly positioned in relation to the preform and said additions of material.

The invention claimed is:

1. A method for manufacturing a composite part with continuous fiber reinforcement and a polymer matrix from a first composite consolidated preform comprising a thermosetting polymer, comprising:

making an assembly zone by depositing a demarcated layer of thermoplastic polymer comprising dispersed metal particles, adapted to act as a susceptor when subjected to induction or microwaves, on one of faces of the first composite consolidated preform, in a form of lines according to a repeated pattern using an additive manufacturing method, a thickness of the lines ranging from 0.05 to 0.1 mm; and assembling on said one of the faces of the first composite consolidated preform a second preform made of stratified composite material by producing a welded assembly by melting the deposited demarcated layer of the thermoplastic polymer using a dynamic process among one of induction or microwaves.

2. The method according to claim 1, wherein the polymer matrix of one or both of the composite preforms comprises a thermosetting polymer.

* * * * *